(12) United States Patent  
Nagata

(10) Patent No.: US 7,895,294 B2  
(45) Date of Patent: Feb. 22, 2011

(54) MULTIMEDIA SYSTEM AND NAVIGATION UNIT TERMINAL

(75) Inventor: Yuu Nagata, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 161 days.

(21) Appl. No.: 12/081,821

(22) Filed: Apr. 22, 2008

(65) Prior Publication Data

US 2008/0263181 A1 Oct. 23, 2008

(30) Foreign Application Priority Data

Apr. 23, 2007 (JP) ............................. 2007-112853

(51) Int. Cl.
G06F 15/16 (2006.01)
G06F 15/177 (2006.01)

(52) U.S. Cl. ...................... 709/218; 709/202; 709/219; 709/221

(58) Field of Classification Search .................. None
See application file for complete search history.

(56) References Cited

U.S. PATENT DOCUMENTS

| 6,304,549 | B1 * | 10/2001 | Srinivasan et al. | 370/230 |
| 6,622,083 | B1 * | 9/2003 | Knockeart et al. | 701/202 |
| 6,807,479 | B2 * | 10/2004 | Watanabe et al. | 701/208 |
| 7,130,723 | B2 * | 10/2006 | Minowa et al. | 701/1 |
| 7,587,715 | B1 * | 9/2009 | Barrett et al. | 717/176 |
| 7,647,039 | B2 * | 1/2010 | Okita et al. | 455/418 |
| 2001/0000355 | A1 * | 4/2001 | Santos et al. | 702/58 |
| 2003/0065440 | A1 * | 4/2003 | Oda et al. | 701/202 |
| 2004/0205153 | A1 * | 10/2004 | Weisshaar et al. | 709/217 |
| 2005/0197748 | A1 * | 9/2005 | Holst et al. | 701/3 |
| 2006/0031410 | A1 * | 2/2006 | Nagata et al. | 709/219 |
| 2006/0161314 | A1 * | 7/2006 | Honmura | 701/1 |

FOREIGN PATENT DOCUMENTS

| JP | A-10-260845 | 9/1998 |
| JP | A-11-296364 | 10/1999 |
| JP | A-2000-010786 | 1/2000 |
| JP | A-2000-207219 | 7/2000 |
| JP | A-2001-075967 | 3/2001 |
| JP | A-2003-114131 | 4/2003 |
| JP | A-2004-289268 | 10/2004 |
| JP | A-2004-295542 | 10/2004 |
| JP | A-2004-302953 | 10/2004 |
| JP | A-2005-107737 | 4/2005 |
| JP | A-2005-202503 | 7/2005 |
| JP | A-2005-233930 | 9/2005 |
| JP | A-2006-209417 | 8/2006 |

* cited by examiner

*Primary Examiner*—John B. Walsh
(74) *Attorney, Agent, or Firm*—Oliff & Berridge, PLC

(57) ABSTRACT

A multimedia system includes a master unit terminal and slave unit terminals. The master unit terminal functions as an interface for communications with an external server, in which status a program updating process is executed between the server and the slave unit terminal. In the multimedia system, property information on the slave unit terminal is acquired when the master unit terminal is connected to the slave unit terminal on a communication-enabled basis, an update program for the slave unit terminal is acquired from the server via the master unit terminal on the basis of the property information, and thereafter the updating process is executed. This scheme in the multimedia system enables troublesomeness felt by a user to be reduced to the greatest possible degree and security for updating the program of the unit terminal to be guaranteed.

10 Claims, 7 Drawing Sheets

| PROPERTY INFORMATION ||
|---|---|
| UNIT ID | : 002(AMPLIFIER) |
| PRODUCT NUMBER | : XXXYYYZZZ |
| MANUFACTURER'S SERIAL NUMBER | : 09876543abc |
| LAST UPDATE DATE | : 2007/03/14 |
| PREDETERMINED MINIMUM CAPACITY | : 12.5Kbyte |

Fig. 4

MULTIMEDIA SYSTEM AND NAVIGATION UNIT TERMINAL

BACKGROUND OF THE INVENTION

1. Field of the Invention

The present invention relates to a multimedia system built up by a plurality of unit terminals and to a navigation unit terminal serving as a unit terminal configuring part of the multimedia system.

2. Description of the Related Art

A program for on-board type control equipment of a vehicle was the latest one when purchased by a user but has been getting old with an elapse of a usage period, resulting in such a case that the latest function provided by a supplier can not be performed. Therefore, the user needs to update the program for the control equipment. Such being the case, there was disclosed a technology (refer to, e.g., Japanese Patent Laid-Open Publication No. 2005-202503) of supplying (downloading) a control program of the latest version provided from the supplier into the control equipment within the vehicle possessed by the user in a way that utilizes radio waves for a mobile phone. The program for the control equipment mounted on the user's vehicle is updated by this technology.

Disclosed further is a technology (refer to, e.g., Japanese Patent Laid-Open Publication No. 2006-209417) related to an efficient program transmission on the occasion of updating the program. This technology is that a should-be-updated program is compared with a new program by use of a checksum system in a plurality of blocks organizing the program, and only a block portion with the checksum proving not to be identical as a result of the comparison is transmitted for the update. With this scheme, a size of the program that should be transmitted for the update can be reduced, and the program can be efficiently transferred.

Other technologies related to the update of the program are disclosed in Japanese Patent Laid-Open Publication Nos. 2005-233930, 2001-75967, H11-296364 and 2004-295542.

SUMMARY OF THE INVENTION

A multimedia system is built up by a plurality of unit terminals each having a program that might be updated for a variety of purposes, wherein these unit terminals are exemplified by units for the on-board control equipment described above. In this type of multimedia system, it is of importance in terms of improving convenience to the user that the programs in the unit terminals are updated. According to the prior arts, however, the user judges a necessity of updating the program for each individual unit terminal and, if necessary, installs an update program into the unit terminal by use of mediums such as a CD and DVD or requests a supplier of the unit terminal to update the program by carrying the unit terminal to a place of the supplier. This imposes a large burden on the user, of which troublesomeness can not be ignored.

If those plural unit terminals are provided from different suppliers, a degree of freedom for the user to update the program is restricted for a reason of the security in order for the program held by each unit terminal not to be leaked outside. As a result, the troublesomeness felt by the user becomes more conspicuous.

It is an object of the present invention, which was devised in view of the problems given above, to provide a multimedia system built up by a plurality of unit terminals and capable of reducing troublesomeness felt by a user to the greatest possible degree and guaranteeing the security for updating a program of each of the unit terminals.

According to the present invention, to accomplish the above object, in a multimedia system including a plurality of unit terminals, one single unit terminal is made to function as a master unit terminal that controls the update of programs of other unit terminals on the whole, whereby the programs of other unit terminals are updated via the master unit terminal. This scheme is not that a user sequentially updates the programs of the unit terminals but that the master unit terminal manages the update of the programs of other unit terminals, thereby enabling the troublesomeness felt by the user to be obviated.

Specifically, according to the present invention, a multimedia system including a plurality of unit terminals, comprises: a master unit terminal defined as one of the plurality of unit terminals in the multimedia system and functioning as an interface for performing communications with a server located outside the multimedia system and with each of the plurality of unit terminals; and a slave unit terminal defined as a unit terminal other than the master unit terminal in the plurality of unit terminals and connected on a communication-enabled basis to the master unit terminal, the multimedia system updating the program held on the slave unit terminal by performing the communications with the server and with the master unit terminal. The multimedia system further comprises: a slave information acquiring unit acquiring, when the master unit terminal and the slave unit terminal are connected on the communication-enabled basis, property information on the slave unit terminal for the master unit terminal; an update program acquiring unit acquiring an update program for the slave unit terminal from the server via the master unit terminal on the basis of the property information acquired by the slave information acquiring unit; and an updating unit updating a program in the slave unit terminal into the update program acquired by the update program acquiring unit.

At first, a characteristic of the multimedia system according to the present invention resides in its configuration. A configuration of the multimedia system built up by the plurality of terminal units includes a single master unit terminal and one or plural slave unit terminals. A difference between the master unit terminal and the slave unit terminal is not necessarily determined by functions and characteristics of the individual unit terminals. This terminology is nothing but to assign a whole control function to a unit terminal named the master unit terminal in a way that takes into consideration the update of the program held by each slave unit terminal. Accordingly in the present multimedia system, the unit terminal dedicated to the master unit terminal may be disposed, and a relation between the master and the slave may be properly established by considering a capability of which the each individual unit terminal is possessed and a load applied thereon. Note that a topology between the master unit terminal and the slave unit terminals can include a variety of connection modes on the premise that the master unit terminal is connected on a communication-enabled basis to the individual slave unit terminals.

When the slave unit terminal is connected to the master unit terminal, i.e., when there occurs a status enabling the present multimedia system to function, the slave information acquiring unit acquires the property information of the slave unit terminal, and a result of this acquisition is transferred to the master unit terminal. The property information is information on the slave unit terminal partly configuring the multimedia system. The property information contains at least information for identifying, e.g., an individual (terminal) and information used for updating the program in the slave unit terminal through the master unit terminal.

Based on the property information, the update program acquiring unit acquires the update program between the server and the master unit terminal. A phrase "based on the property information" connotes being used as a basis for judgment in order to execute a variety of processes about the update of the programs held by the slave unit terminals, such as specifying the target update program and determining whether the update of the program is appropriate or not.

Thus, in the multimedia system according to the present invention, on the occasion of updating the program of the slave unit terminal, the master unit terminal serving as a core terminal executes the processes ranging to the process of acquiring the update program from the server. With this scheme, the update of the programs of the slave unit terminals connected on the "communication-enabled" basis to the master unit terminal is controlled under the management of the master unit terminal. Therefore, the user has no necessity for setting and adjusting the update of the program of the slave unit terminal each time, thereby reducing a burden on the user. Especially, a remarkable effect is to obviate such a burden that the user carries the slave unit terminal to each supplier. Note that the update program acquired by the update program acquiring unit is thereafter updated with an existing program by the updating unit in the target slave unit terminal.

As to a correlation between the multimedia system and the server, the multimedia system may be allocated fixedly on, e.g., the ground and may also be disposed on a movable object like a vehicle. Namely, the multimedia system may be allocated in a fixed mode or a movable mode with respect to the server. As to the communications between the multimedia system and the server, a wired or wireless communication mode may be properly adopted corresponding to the correlation therebetween.

Note that with respect to the update of the program held by the master unit terminal, the master unit terminal is originally communicable with the server, and hence the update program for the master unit terminal may be acquired according to the acquisition of the update program by the update program acquiring unit separately from or synchronously with timing when updating the program of the slave unit terminal.

Herein, the multimedia system may further comprise an update appropriateness determining unit causing, via the master unit terminal, the server to determine based on the property information acquired by the slave information acquiring unit whether or not the slave unit terminal at which the property information is targeted becomes a target appropriate for updating the program in the multimedia system. In this case, the update program acquiring unit may, when the update appropriateness determining unit determines that the slave unit terminal is the target appropriate for updating the program, acquire the update program for the slave unit terminal from the server via the master unit terminal.

The update appropriateness determining unit determines whether or not the slave unit terminal is qualified to be provided with the update program from the server in a way that uses the information contained in the property information, from which the slave unit terminal can be identified as an individual. With this scheme, when an invalid slave unit terminal pretends (spoofing) to be a valid terminal and is thus connected to the master unit terminal, the program of the slave unit terminal can be prevented from being updated on this occasion.

The multimedia system may further comprise an update checking unit causing, via the master unit terminal, the server to check based on the property information acquired by the slave information acquiring unit whether or not the program held by the slave unit terminal at which the property information is targeted is a program required to be updated. In this case, the update program acquiring unit may acquire, when the update checking unit determines that the program is required to be updated, the update program for the slave unit terminal from the server via the master unit terminal.

Namely, as a stage before the update program acquiring unit acquires the update program, the update checking unit checks the update of the program. The execution of the update checking process avoids redundantly frequently repeating the acquisition of the update program from the server, thereby enabling the loads on the server and on the master unit terminal to be reduced.

The update checking unit may segment the update target program in the slave unit terminal according to every predetermined area, check a necessity for updating the program by making a partial comparison about the update target program between the server and the slave unit terminal according to every segmented area via the master unit terminal, then narrow stepwise, when confirming the necessity for updating the program as a result of the comparison, a capacity of the predetermined area becoming a further comparison target down to a predetermined minimum capacity, and check the necessity for updating the program according to every predetermined area of which the capacity has been narrowed down stepwise.

Specifically, the update checking unit does not set the update checking target to the whole program held by the slave unit terminal but searches for a program portion required to be updated in the whole program and transfers only this portion as (part of) the program that needs updating to the update program acquiring unit. A capacity of the update program acquired by the update program acquiring unit can be thereby decreased as much as possible. This contributes to reduce the loads applied on the server and the master unit terminal when updating the program.

More specifically, the update checking unit segments the whole update target program according to every predetermined area, and checks whether the segmented program is an update target or not by comparing the program belonging to the segmented area with the data held by the server. As a result of the comparison, if necessary for updating, the segmented program as a whole is further subsegmented into minute predetermined areas, wherein the same comparative judgment is made. This program segmenting/comparing cycle continues stepwise till a minimum capacity of the segmented predetermined area reaches the predetermined minimum capacity. Thus, the area of the comparison target program is stepwise shifted initially from the large area to the small area. The should-be-updated portion of the program can be thereby efficiently searched, and this contributes to reduce the time needed for updating the program.

The predetermined minimum capacity may be determined based on a communication speed between the master unit terminal and the slave unit terminal. With this scheme, the update program acquiring unit acquires the update program eventually according to every program having the predetermined minimum capacity. The predetermined minimum capacity defined as the minimum unit for the acquisition thereof is determined in relation to a communication speed between the master unit terminal and the slave unit terminal, whereby the update program can be acquired efficiently with less of futility while avoiding residence (overflow) in the middle of the communications.

The slave unit terminal may further include a temporary storage unit that temporarily stores the program acquired by the update program acquiring unit, and the updating unit may update the program in the slave unit terminal into the program stored in the temporary storing unit. In the case of this configuration, the predetermined minimum capacity may be determined based on program updating performance of the updating unit. Similarly, the predetermined minimum capacity defined as the minimum unit for the acquisition by the update program acquiring unit is thus determined in relation to the updating performance of the updating unit, whereby it is possible to avoid the residence of the program in the temporary storage unit that is temporarily stored with the update program.

In the multimedia system described so far, the slave information acquiring unit may acquire a value of the predetermined minimum capacity as part of the property information from the slave unit terminal when the master unit terminal and the slave unit terminal are connected to each other on the communication-enabled basis for the first time. The acquisition of the update program and the updating process are done more smoothly via the master unit terminal.

In the multimedia system described so far, the update checking unit may check the necessity for updating the program by comparing part of the update target program in the slave unit terminal with data in the server according to every predetermined area on the basis of a checksum system. The comparison based on the checksum system enables the time needed for checking the necessity for updating to be further reduced.

The multimedia system described so far may further comprise an encryption processing unit executing, when the update program acquiring unit acquires the update program, an encryption process about the update program in order to disable the master unit terminal from decrypting the update program. The technique of updating the program in the slave unit terminal via the master unit terminal is, as described above, characteristic of the multimedia system according to the present invention. Hence, it follows that the master unit terminal becomes an in-between terminal for the updating process. Herein, the update program sent from the server should be transmitted to the slave unit terminal, and there might be a case in which it is undesirable that the in-between master unit terminal knows a content of the update program. Such being the case, the encryption processing unit executes the encryption process, thereby enabling the program to be updated in security on the slave unit terminal without deviating from the gist of the present invention. The encryption process also becomes a measure against the leakage to the outside in the communications between the server and the master unit terminal.

In the multimedia system described so far, the updating unit may updates the program into the update program after the slave unit terminal becoming the update target terminal has finished a normal process. The "normal process" is a process executed for the slave unit terminal to perform its function. With this scheme, the execution of the update of the program avoids hindering the normal process.

In the multimedia system described so far, the multimedia system is capable of performing the communications with a plurality of servers located outside the multimedia system, in which case the update program acquiring unit may specify the server that should be accessed by the master unit terminal on the basis of the property information acquired by the slave information acquiring unit, and may acquire the update program from the specified server via the master unit terminal. Namely, the proper server having the update program is specified based on the property information on each slave unit terminal, whereby the program can be surely updated in the multimedia system built up by the variety of slave unit terminals supplied from the different suppliers.

The present invention can be grasped from an aspect of the multimedia system including a server in addition to the master unit terminal and the slave unit terminals. To be specific, a multimedia system including a plurality of unit terminals, comprises: a server supplying, when updating a program in a unit terminal, a new program to the unit terminal; a master unit terminal defined as one of the plurality of unit terminals in the multimedia system and functioning as an interface for performing communications with the server and with each of the plurality of unit terminals; a slave unit terminal defined as a unit terminal other than the master unit terminal in the plurality of unit terminals and connected on a communication-enabled basis to the master unit terminal; a slave information acquiring unit acquiring, when the master unit terminal and the slave unit terminal are connected on the communication-enabled basis, property information on the slave unit terminal for the master unit terminal; an update program acquiring unit acquiring an update program for the slave unit terminal from the server via the master unit terminal on the basis of the property information acquired by the slave information acquiring unit; and an updating unit updating a program in the slave unit terminal into the update program acquired by the update program acquiring unit. In the thus-configured multimedia system, in the same way as by the multimedia system described above, the program of the slave unit terminal is updated through the master unit terminal, whereby the troublesomeness felt by the user can be reduced.

Still further, the present invention can be grasped from an aspect different from the multimedia systems described so far. Namely, according to the present invention, in a navigation unit terminal comprising a navigation information acquiring unit acquiring navigation information from an external server located outside a vehicle, the navigation unit terminal is mounted on the vehicle and navigating the vehicle on the basis of the navigation information acquired by the navigation information acquiring unit, and is connected to a single or plural slave unit terminals mounted on the vehicle on a communication-enabled basis and functioning as an interface for performing the communications with a multimedia system including the navigation unit terminal and the slave unit terminal(s) and with the external server. The navigation unit terminal further comprises: a slave information acquiring unit acquiring property information on the slave unit terminal when the navigation unit terminal is connected to the slave unit terminal on the communication-enabled basis; an update program acquiring unit acquiring an update program needed for updating a program in the slave unit terminal from the external server via the navigation information acquiring unit on the basis of the property information acquired by the slave information acquiring unit; and an updating unit causing the slave unit terminal to update the program in the slave unit terminal into the update program acquired by the update program acquiring unit.

The navigation unit terminal is a device that acquires from the outside the navigation information necessary for navigating the vehicle. In this navigation unit terminal, the interface with the outside is utilized also as an interface with the master unit terminal in the multimedia system described so far, whereby the program of the slave unit terminal in the multimedia system built up within the vehicle can be smoothly updated. Note that the navigation information given herein is not limited to GPS (Global Positioning System) information for grasping a position of the vehicle but includes traffic information and other categories of transportation-related information for supporting the navigation. A general practice in terms of considering the vehicle to be a movable body is that the navigation information acquiring unit acquires the navigation information wirelessly. If capable of acquiring the navigation information via a cable, any inconvenience may not be caused by making use of the cable.

From what has been described so far, it is feasible to provide the multimedia system built up by the plurality of unit terminals, which is capable of reducing the troublesomeness felt by the user and guaranteeing the security for updating the program of the unit terminal.

BRIEF DESCRIPTION OF THE DRAWINGS

FIG. 4 is a diagram exemplifying property information on the slave unit terminal, which is acquired by the master unit terminal from the slave unit terminal in the update control flow shown in FIG. 3;

DESCRIPTION OF THE PREFERRED EMBODIMENTS

Figure 1:
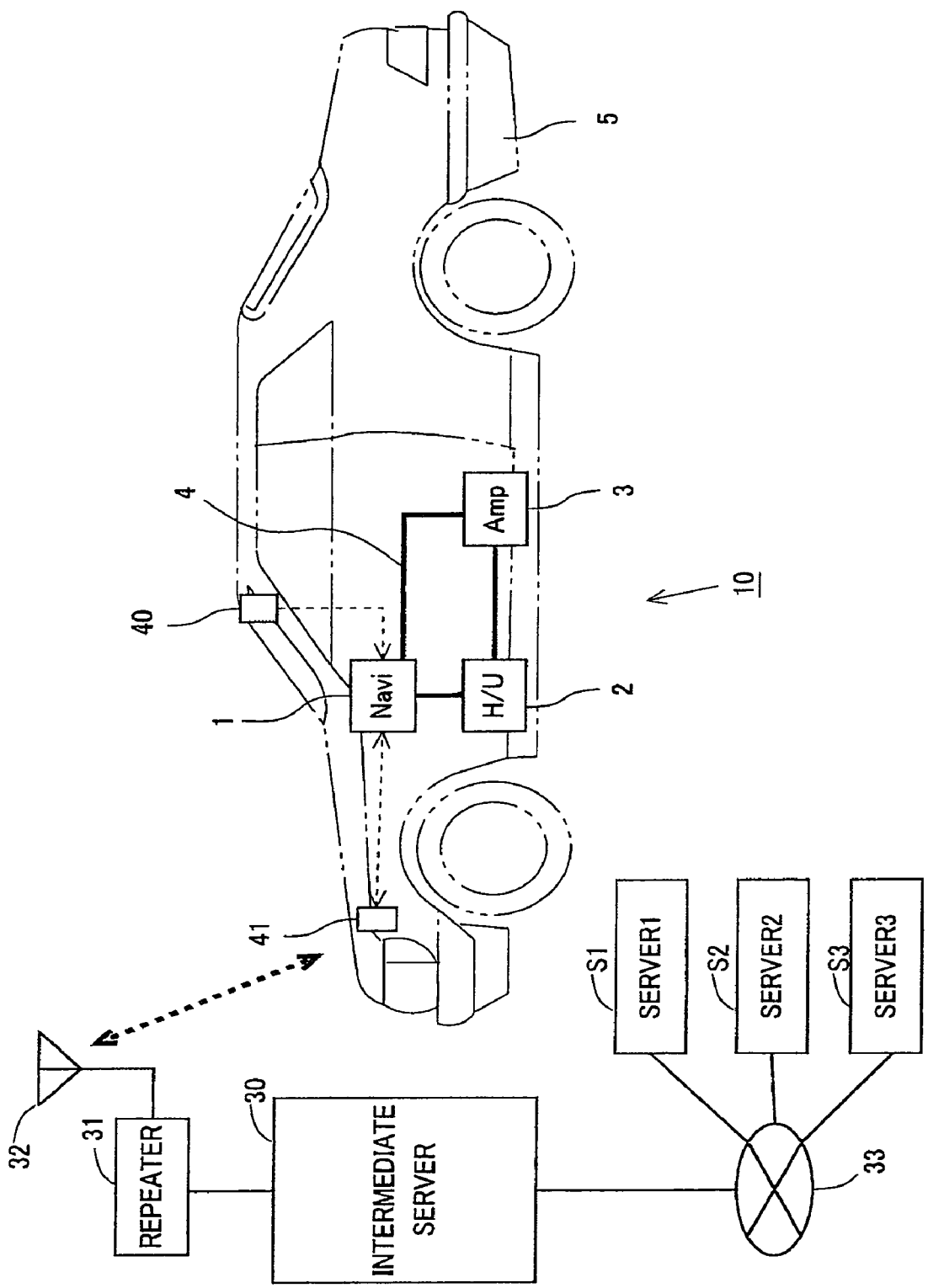
FIG. 1 is a view illustrating an outline configuration of a multimedia system according to an embodiment of the present invention, and showing outlines of servers accessible from the multimedia system.

FIG. 1 is a view illustrating an outline configuration of a multimedia system 10 according to the present invention, and showing outlines of servers S1-S3 accessible from the multimedia system 10. The multimedia system 10 is mounted on a vehicle 5 and includes three pieces of unit terminals such as a navigation apparatus 1, a head unit 2 and an amplifier 3. The "unit terminals" connoted herein are defined as apparatuses each having a should-be-performed function and capable of transferring and receiving data in a way that links up with each other on a communication-enabled basis. This linkage scheme enables a user to build up one single multimedia system by linking a variety of unit terminals according to user's own favorites and necessities. In this connection, the multimedia system 10 according to the present embodiment has the three unit terminals, i.e., the navigation apparatus 1, the head unit 2 and the amplifier 3 required for navigating the vehicle 5 and for forming an acoustic space in the vehicle 5.

A brief description of each of the unit terminals will be given. The description will start with the navigation apparatus 1. The navigation apparatus 1 is an apparatus that navigates the vehicle 5 of the user in order to assist user's driving. Specifically, a process related to the present location of the vehicle 5 is executed based on GPS (Global Positioning System) information received by a GPS receiving unit 40 provided in the vehicle 5. The vehicle 5 is navigated based on a result of this process. The vehicle 5 is provided with a transmitting/receiving unit 41 that enables wireless communications with the outside via a mobile phone. Transportation-related information such as traffic information received by the transmitting/receiving unit 41 is presented simultaneously with the GPS information or individually to the user, whereby the vehicle 5 is navigated further effectively. A navigation technology by the navigation apparatus has less of a relationship with the core of the multimedia system according to the present invention, and hence its in-depth description is omitted.

The head unit 2 will be explained next. The head unit 2 is an apparatus that executes an arithmetic process for reproducing music for the user within the vehicle 5. The head unit 2 contains a CD/DVD deck and a hard disc drive (HDD) by which the music data is processed for regeneration thereof. The amplifier 3 supplies electric power when sounds are output based on the music data, which has been regeneration-processed by the head unit 2, to an interior throughout within the vehicle 5 from a loudspeaker (unillustrated). Note that the navigation display based on the process by the navigation apparatus 1 is shown to the user via a display unit provided in the head unit 2. The detailed functions of the head unit 2 and of the amplifier 3 have less of the relationship with the core of the multimedia system according to the present invention, and hence their in-depth descriptions are omitted.

Those unit terminals need to transfer and receive the information to and from each other as in the case of the information on the navigation and the information on the regenerated music, and are therefore connected to each other in a communication-enabled status via a LAN (Local Area Network) circuit 4. The above-mentioned functions performed by the unit terminals are attained by executing control programs (which will hereinafter be simply termed [programs]) stored in the individual unit terminals. Each unit terminal is therefore provided with a storage unit stored with the corresponding program and a control unit for getting the function performed by executing the program.

The program preinstalled into each unit terminal turns out to be a so-called out-of-date version with a passage of time. Hence, the function of each unit terminal can not be kept in the latest status unless the version thereof is updated into the latest one. Such being the case, a scheme is that the programs within the unit terminals building up the multimedia system 10 according to the present invention are updated through the wireless communications between the servers S1-S3 having the latest programs and the multimedia system 10. An architecture on the server side will be described. The server S1 has the updated program corresponding to the navigation apparatus 1. The server S2 has the updated program corresponding to the head unit 2. The server S3 has the updated program corresponding to the amplifier 3. The servers S1-S3 are connected to an intermediate server 30 via the Internet 33. The intermediate server 30 is defined as an auxiliary server for relaying the information between the servers S1-S3 and the multimedia system 10 via an antenna 32 and a repeater 31. Accordingly, servers according to the present invention correspond to the servers S1-S3, respectively.

The multimedia system 10 performs the communications with the servers S1-S3 by use of the transmitting/receiving unit 41 serving as an interface for transmitting and receiving the information to and from the navigation apparatus 1. At this time, such a management mode is adopted that the navigation apparatus 1 controls other unit terminals, i.e., the head unit 2 and the amplifier 3. Namely, the navigation apparatus 1 functions as a master unit terminal according to the present invention, while the head unit 2 and the amplifier 3 function as slave unit terminals. The management of updating the programs of the head unit 2 and of the amplifier 3 defined as the slave unit terminals is thereby conducted all via the navigation apparatus 1 serving as the master unit terminal.

The navigation apparatus 1 updates as a whole the programs of the unit terminals configuring the multimedia system 10. This scheme eliminates such a necessity that the user himself or herself carries out a time-consuming process of checking statuses of the programs of the unit terminals each time and acquiring the requisite updated programs from suppliers of the unit terminals when the need arises. This scheme also remarkably improves convenience to the user.

Figure 2:
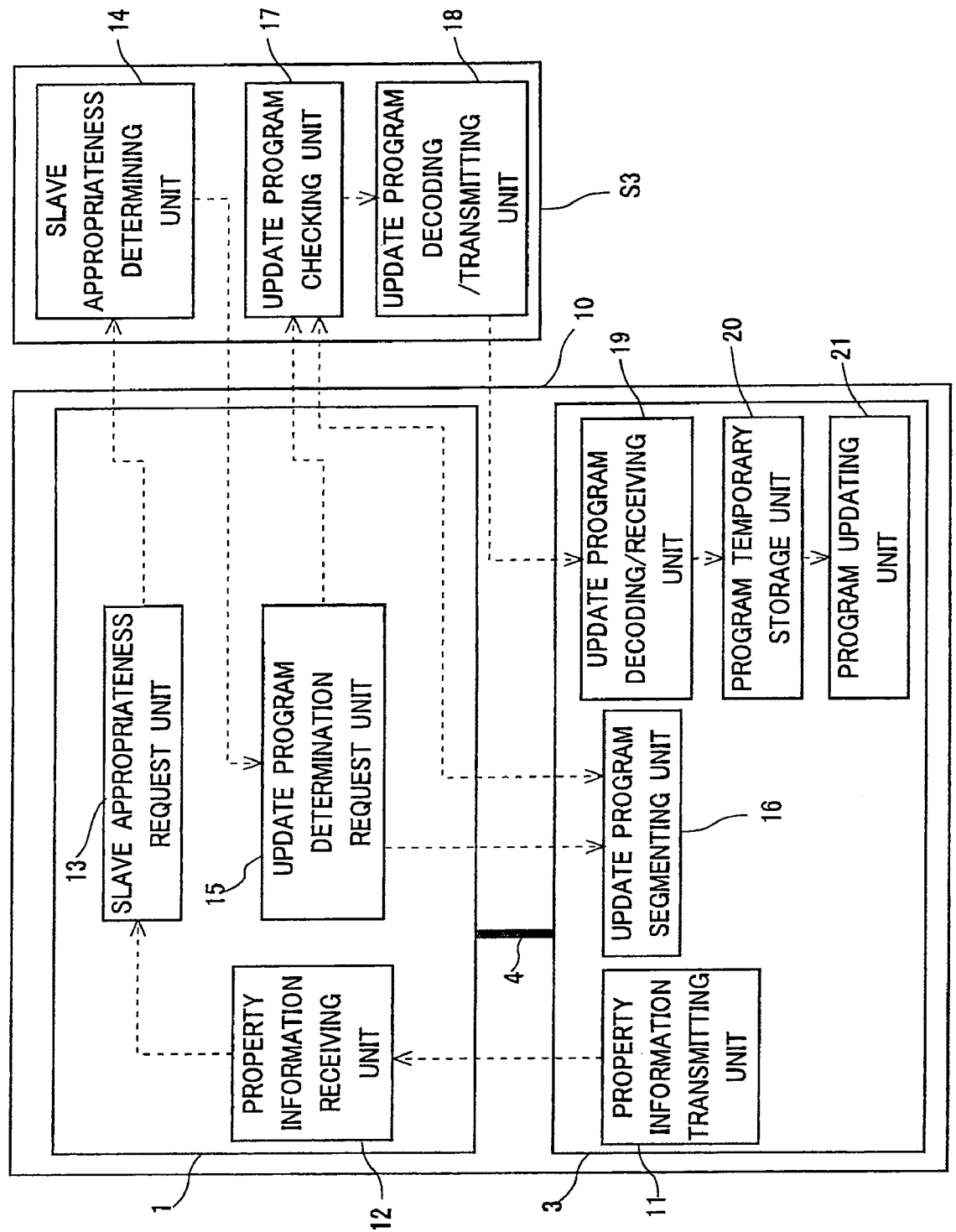
FIG. 2 is a diagram illustrating images of functions by way of [function units] that are performed by the respective components such as the navigation apparatus, which build up the multimedia system according to the embodiment of the present invention, and also illustrating correlations between the function units on the basis of signal flows.

The navigation apparatus 1, the head unit 2, the amplifier 3 and the servers S1-S3 perform the functions illustrated in FIG. 2, thereby attaining the update of the programs in the multimedia system 10 according to the present invention. FIG. 2 illustrates images of the functions by way of [function units] that are performed by the respective components such as the navigation apparatus 1. FIG. 2 also illustrates correlations between the function units on the basis of signal flows. The control units of the individual components execute control program for updating the programs, whereby the functions of the function units are realized. Note that the amplifier 3 is adopted as the slave unit terminal in FIG. 2, resultantly the server S3 corresponding to the amplifier 3 is shown as the server, and an illustration of the head unit 2 is omitted. The function of each function unit will hereinafter be briefly explained.

To begin with, a property information transmitting unit 11 in the amplifier 3 transmits property information of the amplifier 3 to the navigation apparatus 1. A property information receiving unit 12 in the navigation apparatus 1 receives the property information. The "property information" connotes information on an individual, i.e., the amplifier 3 serving as the slave unit terminal. There exist piece of property information having their contents that differ for every slave unit terminal. An in-depth description thereof will be made later on. Thereafter, the property information is transferred to the server S3 via a slave appropriateness request unit 13 in the same navigation apparatus 1. At this time, a slave appropriateness determining unit 14 in the server S3 determines whether or not the amplifier 3 connected to the navigation apparatus 1 is an appropriate slave unit terminal of which the program should be updated. A result of the determination is sent back to the navigation apparatus 1. If the determination result proves that the amplifier 3 is the appropriate slave unit terminal, an update program determination request unit 15 requests an update program segmenting unit 16 in the amplifier 3 and an update program checking unit 17 in the server S3 to determine which segment of the program in the amplifier 3 becomes an update target.

The update program checking unit 17, upon receiving the request from the update program determination request unit 15, finally specifies a need-updating-segment in the program. According to the specified segment, an update program coding/transmitting unit 18 in the server S3 codes a necessary piece of update program and thereafter transmits the coded update program to the amplifier 3 as the slave unit terminal via the navigation apparatus 1. An update program decoding/receiving unit 19 in the amplifier 3 receives and decodes the coded update program. The thus-decoded update program is stored temporarily in a program temporary storage unit 20. Thereafter, a program updating unit 21 updates the existing program into the temporarily-stored update program.

Figure 3:
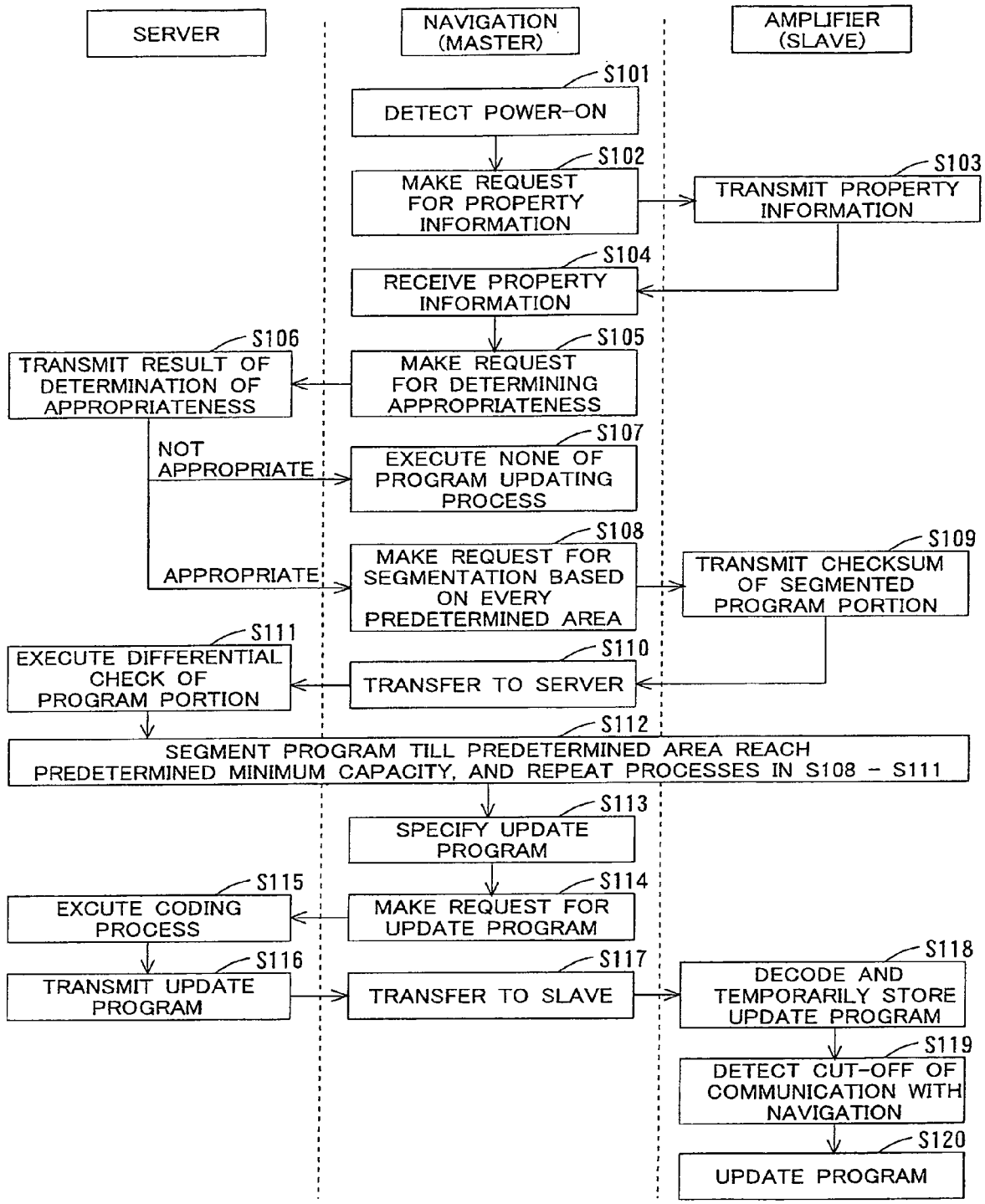
FIG. 3 is a control flow chart for updating the program of the slave unit terminal, which is carried out in the multimedia system according to the embodiment of the present invention.

Herein, a process of updating the program in the amplifier 3, which is executed by the respective function units shown in FIG. 2, will be described in detail with reference to FIG. 3. Note that the process shown in FIG. 3 is, as stated above, executed by the control units provided respectively in the navigation apparatus 1, the amplifier 3 and the server S3.

At first, it is detected in S101 that the multimedia system 10 is powered ON. To be specific, the detection of the power-ON is, it is assumed, attained by supplying the electric power to the multimedia system 10 from a battery provided in the vehicle 5. When terminating the process in S101, the operation proceeds to S102. In S102, the navigation apparatus 1 requests the amplifier 3 to transmit the property information on the amplifier 3 to the navigation apparatus 1 defined as the master unit terminal. As a result, in S103, the property information transmitting unit 11 transmits the property information on the amplifier 3. FIG. 4 shows herein one example of the property information on the amplifier 3. The property information on the amplifier 3 is organized based on fields such as a "unit ID" defined as an identification number of the unit terminal in the multimedia system 10, a "product number" specifying the amplifier 3 as a product, a "manufacturer's serial number" (serial number) for identifying the amplifier 3 as an individual, and a "latest update date" representing the latest date when the program held by the amplifier 3 has been updated. The property information on the amplifier 3 further contains a "predetermined minimum capacity" field representing a parameter in relation to specifying and acquiring the update program that will be mentioned later on. A variety of processes, which will be hereinafter explained, are carried out based on these items of information.

In S104, the property information receiving unit 12 receives the property information on the amplifier 3, which is transmitted in S103. Namely, the navigation apparatus 1 serving as the master unit terminal acquires the property information on each of the slave unit terminals connected in the communication-enabled status to the navigation apparatus itself. This scheme enables the navigation apparatus 1 to recognize all of the unit terminals building up the whole multimedia system 10. Upon finishing the process in S104, the operation proceeds to S105.

In S105, according to the property information on the amplifier 3 that has been received by the property information receiving unit 12, the slave appropriateness request unit 13 requests the server S3 to determine whether or not the amplifier 3 is an appropriate slave unit terminal of which the program is to be updated. Specifically, the property information is transmitted to the server S3, and the slave appropriateness request unit 13 requests the server S3 for a result of the determination made by the server S3. Incidentally, a technique of specifying the server to which the navigation apparatus 1 sends the request, is such that the amplifier 3 and the server S3 are previously associated with each other in the navigation apparatus 1, and the existence of the amplifier 3 is recognized based on the acquired property information, thereby specifying the server. When the process in S105 is finished, the operation proceeds to S106.

In S106, the server S3 determines, based on the property information transmitted from the navigation apparatus 1, whether or not the amplifier 3 is an appropriate slave unit terminal permitted to undergo the update of the program. This determination is made by the slave appropriateness determining unit 14. In the case of the property information shown in, e.g., FIG. 4, the server S3 collates the product number information and the manufacturer's serial number information with the information in a database held by the server S3 itself, thereby judging whether the amplifier 3 is a program update support target unit terminal or not. With this scheme, it is feasible to prevent the upgrade of the program of the unit terminal establishing an invalid connection to the multimedia system 10. A result of determination about the appropriateness is sent again to the navigation apparatus 1.

Executed thereafter in the navigation apparatus 1 is the process based on the result of the determination made by the slave appropriateness determining unit 14. If the result of the determination proves to be inappropriate, the amplifier 3 as the slave unit terminal undergoes none of the program updating process (S107). Whereas if the result of the determination proves to be appropriate, processes from S108 onward are executed in order for the amplifier 3 as the slave unit terminal to undergo the program updating process.

Note that the program updating process according to the processes from S108 onward may be started at proper timing in a way that takes into consideration a processing load applied on the navigation apparatus 1 and a processing load applied on the amplifier 3. Basically, the navigation apparatus 1 judges whether or not the processes from S108 onward are automatically executed. For example, the navigation apparatus 1 queries the server S3 about the latest update date in the property information. If the latest update date is earlier than the date of the latest update program of the server S3, the navigation apparatus 1 executes the processes from S108 onward at the proper timing. The navigation apparatus 1, when receiving an update instruction from the user, may send a query to the server S3.

Figure 5A:
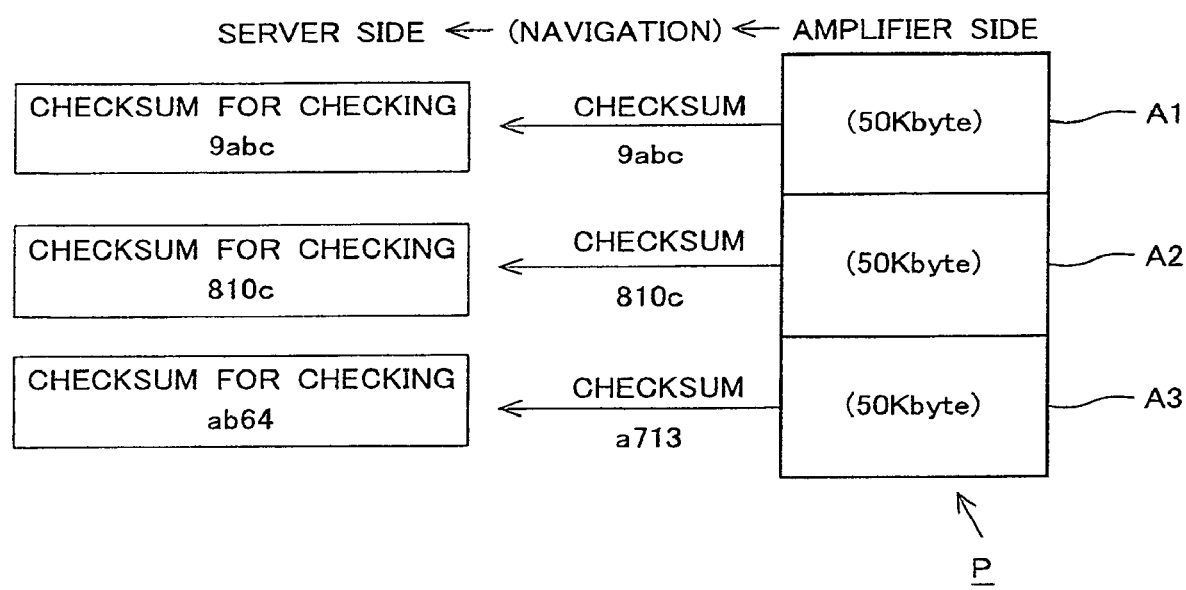
FIG. 5A is first diagram schematizing a procedure for specifying an update portion of an update program, which is conducted in the update control flow shown in FIG. 3.
Figure 5B:
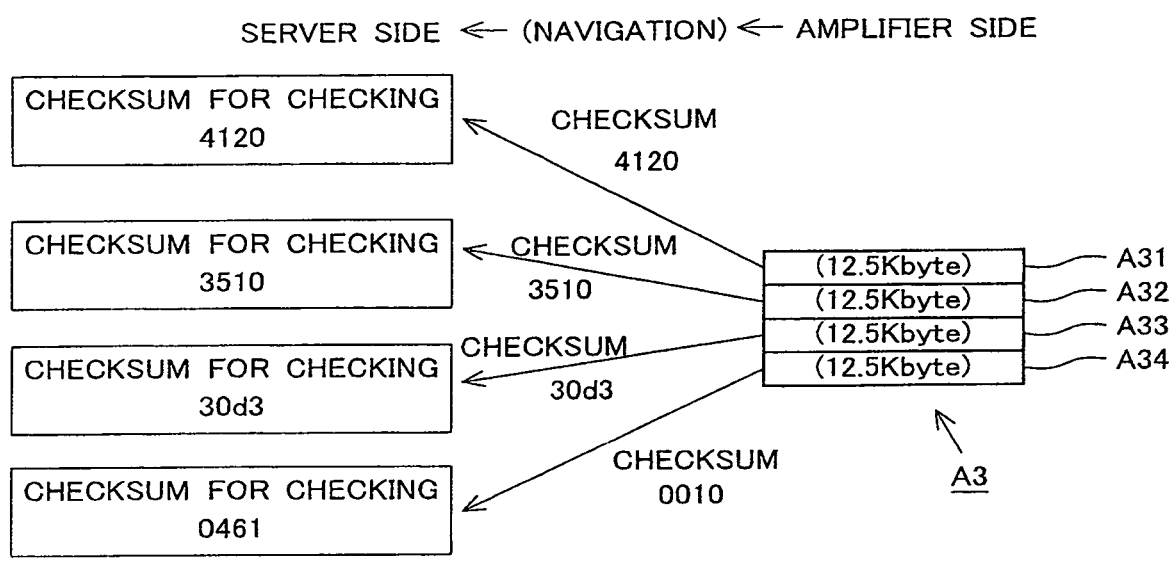
FIG. 5B is second diagram schematizing the procedure for specifying the update portion of the update program, which is conducted in the update control flow shown in FIG. 3.

The processes from S108 to S113 will be herein described with reference to FIGS. 5A and 5B. FIGS. 5A and 5B are diagrams each showing specific operations mainly of the update program segmenting unit 16 and the update program checking unit 17. At first, in S108, the update program determination request unit 15 requests the update program segmenting unit 16 to segment the update target program at an interval of a predetermined area. Simultaneously, the update program determination request unit 15 instructs the update program checking unit 17 to stand by for a process in S111 which will be described later on.

The "predetermined area" herein connotes such an area that the program is expedientially segmented for specifying a substantially-need-updating portion in the update target program. The program in the amplifier 3 is compared, based on every predetermined area for segmentation, with the data about the update program managed by the server S3. If discrepant therebetween, it can be judged that the program portion belonging to the predetermined area needs to undergo the updating process. The program is thus segmented at the interval of the predetermined area, thereby enabling a capacity of the program (precisely, the program portion) required to be updated to be eventually reduced to the greatest possible degree and enabling the load caused by the updating process to be decreased. According to the present embodiment, to begin with, the update program determination request unit 15 gives a first segmentation request to the update program segmenting unit 16. An assumption in this segmentation request is that a program P held by the amplifier 3 is segmented by the predetermined area having a capacity of 50 Kbytes into three segments from the head, and segmented program portions A1-A3 are thus formed. This point will be clear as illustrated in FIG. 5A.

Next in S109, checksum data for each of the segmented program portions A1-A3 is transmitted to the navigation apparatus 1, and the navigation apparatus 1 transfers the checksum data to the server S3 (S110). At this time, the navigation apparatus 1 therefore executes none of special processes for the checksum data. According to the present embodiment, "9abc" represents the checksum data for the program portion A1, "810c" denotes the checksum data for the program portion A2, and "a713" stands for the checksum data for the program portion A3. The respective pieces of data are transferred via the navigation apparatus 1 to the server S3.

When the checksum data is transferred to the server S3, a difference check between the program portions is conducted by way of a process in S111 by the update program checking unit 17. As shown in FIG. 5A, the server S3 retains the check-oriented checksum data for every program portion on the side of the server. The checksum data are generated in a way that similarly segments the update program by the predetermined area having the capacity of 50 Kbytes from the head. In the present embodiment, the checksum data are sequenced such as "9abc", "810c" and "ab64" from the head of the update program. The update program checking unit 17 makes a comparison between the corresponding program portions from the head of the program, thus determining whether the checksum data are coincident with each other or not. In the present embodiment, there is a discrepancy between the program portion A3 of the program P and the third program portion from the head of the update program, and hence it is determined that the program portion A3 is required to be updated.

Herein, in the multimedia system 10 according to the present invention, a process in S112 is executed for further narrowing down which part in the program portion A3 needs updating. The program portion required to be updated is thus narrowed down to the part as minutely as possible, whereby the load taken for updating the program can be further reduced. To be specific, the processes from S108 to S111 are repeatedly executed in S112 with respect to the program portion with the occurrence of the discrepancy in the checksum data as in the case of the program portion A3. At this time, the program portion is subsegmented into a plurality of minute portions by setting the capacity of the predetermined area to a capacity smaller than the value of the last time. Note that the program portion is further subsegmented stepwise till the capacity of the finally-segmented program portion reaches a predetermined minimum capacity.

The predetermined minimum capacity is determined based on a communication speed of the LAN circuit 4 that establishes the connection between the navigation apparatus 1 defined as the master unit terminal and the amplifier 3 as the slave unit terminal, a storage capacity of the program temporary storage unit 20 provided in the amplifier 3 and an updating speed of the program updating unit 21. The predetermined minimum capacity of the amplifier 3 is on the order of 12.5 Kbytes in the present embodiment. Those parameters on which the predetermined minimum capacity is determined based are, when the update program flows to (the update program is downloaded into) the amplifier 3 from the server S3, the parameters related to smoothness of this flow. According to the present invention, the program portion segmented for every predetermined area having a size of the predetermined minimum capacity is sent finally to the amplifier 3 via the navigation apparatus 1 from the server S3. Therefore, the size of the program portion is set to the predetermined minimum capacity conceived as the proper size. This scheme enables a flow of the download to be smoothly kept and a fault such as an overflow to be avoided. The scheme also enables avoidance of a rise in repetition count of the consecutive processes from S108 to S111, which occurs due to unconsidered subsegmentation of the program P. The reduction in the load taken for updating the program of the amplifier 3 can be thereby effectively attained.

According to the present embodiment, the program portion A3 is segmented by 4 on the basis of the predetermined minimum capacity from the state shown in FIG. 5A, whereby much smaller program portions A31-A34 are formed. In the same way as in the case of giving the explanation with reference to FIG. 5A, pieces of checksum data of the program portions A31-A34 are compared with pieces of checksum data of the program portions of the update program, which are prepared on the side of the server S3 and correspond to the program portions A31-A34, thereby specifying a discrepancy therebetween. A conclusion acquired in the present embodiment is that the program portion 34A of the program P is partially discrepant from the update program held by the server S3, and the update program (which is precisely a portion thereof) that should be acquired in the end from the server S3 is specified (S113). Such being the case, in S114, the navigation apparatus 1 issues a request to the server S3 in order to transmit the update program specified in S113 to the amplifier 3.

The scheme in the present embodiment is that the state shown in FIG. 5A is shifted at the single stage directly to the state shown in FIG. 5B, however, another available scheme is that the program portion A3 is segmented further stepwise such as changing the capacity from 50 Kbytes via 25 Kbytes finally to 12.5 Kbytes.

The server S3, to which the update program transmission request has been issued, executes in S115 a coding process for a program portion (which is the program portion of which the checksum shown in FIG. 5B is designated by "0461") of the should-be-transmitted update program. The coding process intends to prevent the content of the update program from being known by the navigation apparatus 1 taking an intermediary position for the data transmission and to be a measure against an external leakage. The thus-coded update program is transmitted to the navigation apparatus 1 in S116 and is further transferred to the amplifier 3 classified as the slave unit terminal (S117). Coding and transmitting on the side of the server are carried out by the update program coding/transmitting unit 18.

Thereafter, the update program decoding/receiving unit 19 receives and decodes the transferred coded update program. The update program after being decoded is temporarily stored in the program temporary storage unit 20. Note that a processing flow of the update program from S115 to S118 is performed on the basis of the program portion segmented by the predetermined area having the predetermined minimum capacity.

Figure 6:
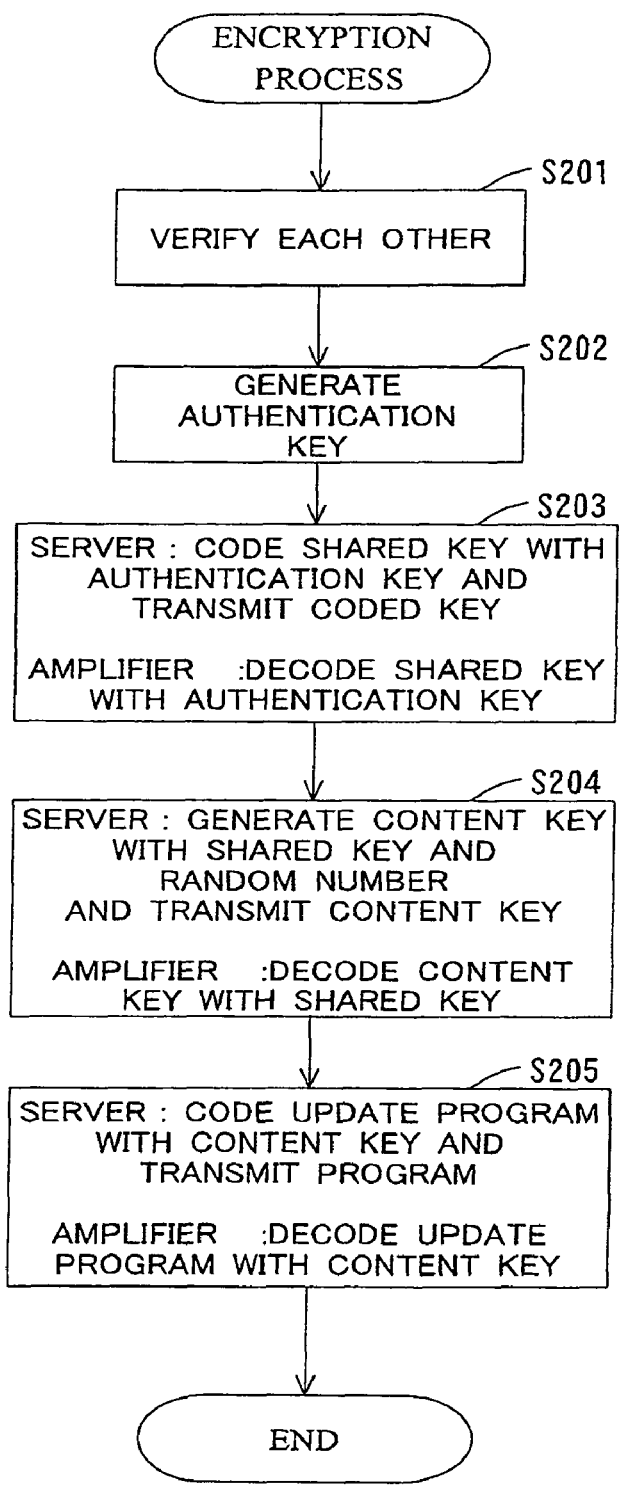
FIG. 6 is a flowchart of a process of coding and decoding the update program, which is executed in the update control flow shown in FIG. 3.

Herein, the processes of coding and decoding the program portion In S115 through S118 are carried out by the conventional techniques, and hence the in-depth description thereof is limited to a brief explanation based on a processing flow shown in FIG. 6. FIG. 6 is a flowchart showing the coding/decoding processes generically as an encryption process. The encryption process starts in S201 with mutual authentication between the server S3 and the amplifier 3. The mutual authentication involves mutually verifying whether these devices conform to DTCP (Digital Transmission Content Protection) standards or not. If both of the devices meet the DTCP standards, it is considered that both can keep the copyright of the update program. The following processes are those based on such a premise that both of the devices meet the DTCP standards. Upon finishing the process in S201, the operation proceeds to S202.

In S202, the server S3 and the amplifier 3, which have been mutually authenticated, generate authentication keys for each other. Thereafter in S203, the server S3 codes a shared key (secret key) with the authentication key and transmits the coded shared key to the amplifier 3, while the amplifier 3 receiving this shared key decodes the coded shared key with the authentication key. In S204, the server S3 generates a content key according to the shared key and a random number, and transmits the content key and the random number to the amplifier 3. The amplifier 3 decodes the received content key on the basis of the shared key and the received random number. As a result, each of the server S3 and the amplifier 3 comes to have the content key with high independency guaranteed.

In S205, the server S3 codes the update program with the content key, which should be transmitted to the amplifier 3 from the server S3, and transmits the coded update program to the amplifier 3. The amplifier 3 decodes the received coded update program by using the content key.

The coding/decoding process described above is executed between the server S3 and the amplifier 3, whereby the navigation apparatus 1 is disabled from knowing the content of the update program even in batchwise management for updating the program on the slave unit terminal by the navigation apparatus 1, which is characteristic of the multimedia system 10 according to the present invention. It is therefore feasible to keep the security for transferring and receiving the data between the server S3 and the amplifier 3. The wireless communications are performed between the navigation apparatus 1 and the respective servers, however, a damage caused by an outflow of the information to the outside can be prevented by the encryption process.

Getting herein back to the processes shown in FIG. 3, after temporarily storing the update program in S118, the process in S119 is executed. It is detected in S119 that the communications via the LAN circuit 4 between the navigation apparatus 1 and the amplifier 3 are cut off. This detection implies detection of a status in which the user sets OFF the function of each of the unit terminals building up the multimedia system 10. Such being the case, after conducting this detection, the program updating unit 21 updates the program in the amplifier 3 by use of the update program stored in the program temporary storage unit 20 (S120). The scheme of thus setting the update execution timing with the update program at a point after the detection in S119, derives from a possibility that if the program is updated in a status where the amplifier 3 is still employed by the user, the process executed at that point of time in the amplifier 3 might be hindered.

According to this control, the programs of the slave unit terminals are updated under the batchwise management by the master unit terminal. Hence, the user has no necessity of paying an attention to the status of the slave unit terminal each time, and the troublesomeness felt by the user is reduced. As to the acquisition of the update program, the program required to be updated is acquired in the minimum range, and hence the increases in the loads on the servers and the unit terminals can be avoided.

The present embodiment has exemplified in detail how the program of the amplifier 3 serving as the slave unit terminal is updated, however, the same process may be executed for updating the program of the navigation apparatus 1 serving as the master unit terminal. At this time, the navigation apparatus 1 may execute, based on the property information retained by the apparatus 1 itself, the process in S105 and a series of processes from S108 to S114. It is preferable that the same encryption process as in the case described above is carried out for acquiring the update program from the server.

What is claimed is:

1. A multimedia system including a plurality of unit terminals, comprising:
   a master unit terminal defined as one of said plurality of unit terminals in said multimedia system and functioning as an interface for performing communications with a server located outside said multimedia system and with each of said plurality of unit terminals;

a slave unit terminal defined as a unit terminal other than said master unit terminal in said plurality of unit terminals and connected on a communication-enabled basis to said master unit terminal;

a slave information acquiring unit acquiring, when said master unit terminal and said slave unit terminal are connected on the communication-enabled basis, property information on said slave unit terminal for said master unit terminal;

an update program acquiring unit acquiring an update program for said slave unit terminal from said server via said master unit terminal on the basis of the property information acquired by said slave information acquiring unit;

an updating unit updating a program in said slave unit terminal into the update program acquired by said update program acquiring unit; and an update checking unit causing, via said master unit terminal, said server to check based on the property information acquired by said slave information acquiring unit whether or not the program held by said slave unit terminal at which the property information is targeted is a program required to be updated, wherein said multimedia system updates the program held on said slave unit terminal by performing the communications with said server and with said master unit terminal, said update program acquiring unit acquires, when said update checking unit determines that the program is required to be updated, the update program for the slave unit terminal from said server via said master unit terminal, and said update checking unit (1) segments the update target program in said slave unit terminal into predetermined areas, (2) checks a necessity for updating the program by making a partial comparison about the update target program between said server and said slave unit terminal for each predetermined area via said master unit terminal, then narrows stepwise, when confirming the necessity for updating the program as a result of the comparison, a capacity of each predetermined area becoming a further comparison target down to a predetermined minimum capacity, and (3) checks the necessity for updating the program for each predetermined area of which the capacity has been narrowed down stepwise.

2. A multimedia system according to claim 1, wherein the predetermined minimum capacity is determined based on a communication speed between said master unit terminal and said slave unit terminal.

3. A multimedia system according to claim 2, wherein said slave unit terminal further includes a temporary storage unit that temporarily stores the program acquired by said update program acquiring unit, said updating unit updates the program in said slave unit terminal into the program stored in said temporary storing unit, and the predetermined minimum capacity is determined based on program updating performance of said updating unit.

4. A multimedia system according to claim 1, wherein said slave information acquiring unit acquires a value of the predetermined minimum capacity as part of the property information from said slave unit terminal when said master unit terminal and said slave unit terminal are connected to each other on the communication-enabled basis for the first time.

5. A multimedia system according to claim 1, wherein said update checking unit checks the necessity for updating the program by comparing part of the update target program in said slave unit terminal with data in said server for each predetermined area on the basis of a checksum system.

6. A multimedia system according to claim 1, further comprising an encryption processing unit executing, when said update program acquiring unit acquires the update program, an encryption process about the update program in order to disable said master unit terminal from decrypting the update program.

7. A multimedia system according to claim 1, wherein said updating unit updates the program into the update program after said slave unit terminal becoming the update target terminal has finished a normal process.

8. A multimedia system according to claim 1, wherein said multimedia system is capable of performing the communications with a plurality of servers located outside said multimedia system, and said update program acquiring unit specifies said server that should be accessed by said master unit terminal on the basis of the property information acquired by said slave information acquiring unit, and acquires the update program from said specified server via said master unit terminal.

9. A multimedia system including a plurality of unit terminals, comprising:

a server supplying, when updating a program in a unit terminal, a new program to said unit terminal;

a master unit terminal defined as one of said plurality of unit terminals in said multimedia system and functioning as an interface for performing communications with said server and with each of said plurality of unit terminals;

a slave unit terminal defined as a unit terminal other than said master unit terminal in said plurality of unit terminals and connected on a communication-enabled basis to said master unit terminal;

a slave information acquiring unit acquiring, when said master unit terminal and said slave unit terminal are connected on the communication-enabled basis, property information on said slave unit terminal for said master unit terminal;

an update program acquiring unit acquiring an update program for said slave unit terminal from said server via said master unit terminal on the basis of the property information acquired by said slave information acquiring unit;

an updating unit updating a program in said slave unit terminal into the update program acquired by said update program acquiring unit; and an update checking unit causing, via said master unit terminal, said server to check, based on the property information acquired by said slave information acquiring unit, whether or not the program held by said slave unit terminal at which the property information is targeted is a program required to be updated, wherein said update program acquiring unit acquires, when said update checking unit determines that the program is required to be updated, the update program for said slave unit terminal from said server via said master unit terminal, and said update checking unit (1) segments the update target program in said slave unit terminal into predetermined areas, (2) checks a necessity for updating the program by making a partial comparison about the update target program between said server and said slave unit terminal for each predetermined area via said master unit terminal, then narrows stepwise, when confirming the necessity for updating the program as a result of the comparison, a capacity of each predetermined area becoming a further comparison target down to a predetermined minimum capacity, and (3) checks the necessity for updating the program for each predetermined area of which the capacity has been narrowed down stepwise.

10. A navigation unit terminal comprising:

a navigation information acquiring unit acquiring navigation information from an external server located outside a vehicle, said navigation unit terminal being mounted on the vehicle and navigating the vehicle on the basis of the navigation information acquired by said navigation information acquiring unit, said navigation unit terminal being connected to at least one slave unit terminal mounted on the vehicle on a communication-enabled basis and functioning as an interface for performing the communications with a multimedia system including said navigation unit terminal and said at least one slave unit terminal and with said external server, said navigation unit further comprising:
- a slave information acquiring unit acquiring property information on said at least one slave unit terminal when said navigation unit terminal is connected to said at least one slave unit terminal on the communication-enabled basis;
- an update program acquiring unit acquiring an update program needed for updating a program in said at least one slave unit terminal from said external server via said navigation information acquiring unit on the basis of the property information acquired by said slave information acquiring unit;
- an updating unit causing said at least one slave unit terminal to update the program in said at least one slave unit terminal into the update program acquired by said update program acquiring unit; and
- an update checking unit causing, via said master unit terminal, said server to check based on the property information acquired by said slave information acquiring unit whether or not the program held by said at least one slave unit terminal at which the property information is targeted is a program required to be updated, wherein said update program acquiring unit acquires, when said update checking unit determines that the program is required to be updated, the update program for said at least one slave unit terminal from said server via said master unit terminal, said update checking unit (1) segments the update target program in said at least one slave unit terminal into predetermined areas, (2) checks a necessity for updating the program by making a partial comparison about the update target program between said external server and said at least one slave unit terminal for each predetermined area via said navigation unit terminal, then narrows stepwise, when confirming the necessity for updating the program as a result of the comparison, a capacity of each predetermined area becoming a further comparison target down to a predetermined minimum capacity, and (3) checks the necessity for updating the program for each predetermined area of which the capacity has been narrowed down stepwise.

* * * * *